United States Patent [19]
Noda

[11] Patent Number: 5,169,586
[45] Date of Patent: Dec. 8, 1992

[54] METHOD OF MANUFACTURING RESIN-SEALED TYPE SEMICONDUCTOR DEVICE

[75] Inventor: Toshio Noda, Tokyo, Japan
[73] Assignee: NEC Corporation, Tokyo, Japan
[21] Appl. No.: 702,242
[22] Filed: May 17, 1991
[30] Foreign Application Priority Data
  May 21, 1990 [JP] Japan ................. 2-130937
[51] Int. Cl.5 .................. B29C 45/02; B29C 45/14
[52] U.S. Cl. ................. 264/272.17; 264/328.5; 264/328.8; 264/328.16
[58] Field of Search .......... 264/272.17, 328.5, 328.11, 264/328.14, 328.16, 328.4, 328.8; 425/127, 129.1

[56] References Cited
U.S. PATENT DOCUMENTS

| | | |
|---|---|---|
| 1,916,495 | 7/1933 | Shaw ................. 264/328.5 |
| 1,993,942 | 3/1935 | Novotny ................. 264/328.5 |
| 4,386,898 | 6/1983 | Sera ................. 264/328.4 |
| 4,426,341 | 1/1984 | Tsuzuku et al. ................. 264/328.4 |
| 4,569,814 | 2/1986 | Chong et al. ................. 264/272.17 |
| 4,599,062 | 7/1986 | Konishi ................. 264/272.17 |
| 4,927,590 | 5/1990 | Poelzing ................. 264/328.5 |
| 4,983,110 | 1/1991 | Yoshida et al. ................. 264/272.17 |

Primary Examiner—Jan H. Silbaugh
Assistant Examiner—A. Y. Ortiz
Attorney, Agent, or Firm—Laff, Whitesel, Conte & Saret

[57] ABSTRACT

A method of manufacturing a resin-sealed type semiconductor device including heating sealing resin at a state of contacting the resin to a cull portion by means of a plunger during a predetermined period at the time the plunger stops its movement. The sealing resin is sufficiently heated to become low viscosity melting state. Thereafter, the melting state resin is injected into a cavity where resin sealing is performed.

3 Claims, 4 Drawing Sheets

METHOD OF MANUFACTURING RESIN-SEALED TYPE SEMICONDUCTOR DEVICE

BACKGROUND OF THE INVENTION

1. (Field of the Invention)

The present invention relates to a method of manufacturing a resin-sealed type semiconductor device and, more particularly, to a method of the resin sealing by melting and injecting a resin tablet in a mold.

2. (Description of Related Art)

The sealing a semiconductor device with a resin is accomplished by using a resin molding machine. This resin molding machine is set with top and bottom forces to form a cavity portion, which is filled with a molten resin by injection. This sealing resin is prepared by forming thermoset resin powder into a cylindrical tablet shape. The bottom force has a pot portion to be charged with the sealing resin; a plunger for pressing and injecting the charged resin onto a cull portion of the top force; and runner portions for guiding the molten resin into the cavity portion. Moreover, the top and bottom forces are individually equipped with heaters for heating and melting the sealing resin. By using the resin molding machine thus constructed, a lead frame on which a semiconductor element is mounted and to which wire bonding is performed is clamped by the top and bottom forces and by injection-molding of the sealing resin the resin-sealed type semiconductor device is fabricated.

This fabrication method will be described in more detail in the following. In the resin injecting portion of the resin molding machine, the plunger is moved downward to an original position, and the space defined by the top face of the plunger and the side wall of the pot portion is charged with the resin tablet. Then, the top and bottom forces are hydraulically clamped. Next, the plunger is moved upward to press the resin tablet onto the cull portion. The injected resin flows through the runner portions into the cavity portion so that the cavity portion is wholly charged with the sealing resin. After lapse of a predetermined time period, the sealing resin is hardened, and the mold is opened to part the sealing resin of the molded piece, the cull portion and the runner portions, thus ending a series of resin molding steps. If necessary, a cleaning step of the mold surfaces may be added. In a conventional method, the process is transferred to the pressure molding step immediately, continuously after the resin molding machine has been charged with the resin tablet.

The fabrication method of the prior art involves following defects. First of all, bonding wires for connecting the bonding pads of a semiconductor element mounted on the island of the lead frame to the inner leads are usually stretched straight when viewed from above but may be greatly curved by the fluid resistance of the sealing resin to cause short-circuit failures. Moreover, the corner portions near the gates of the cavity surfaces of the bottom force always contacts with the new sealing resin flowing through the runners so that they are liable to be blotted with low-molecular weight components of the sealing resin, wax and resin components of unreacted hardening agent or the like. This appears as mold blots and causes uneven surfaces of molded pieces, semiconductor devices, resulting in appearance defect of the products and marking defect.

Blotted mold causes another following problem at the mold parting time. In the parting operation, either of the top and bottom forces is moved relatively apart from each other to open the mold. When the bottom force is moved downward, for example, the ejector pins of the force are simultaneously projected out to part the hardened resin from the top force. Next, when the bottom force drops to its bottom dead center, i.e., the knock-out position, the ejector pins of the bottom force are projected out to separate the sealing resin from the bottom force. In existing fabrication methods, however, the ejector pins are not uniformly raised even when the molded piece is pushed by the ejector pins. As a result, a uniform parting operation cannot be effected to leave the resin in the bottom force or break the resin at the runner portion.

SUMMARY OF THE INVENTION

An object of the present invention is to provide a resin-sealed type semiconductor device manufacturing method which can effect injection and parting of a sealing resin easily.

Another object of the present invention is to provide a resin-sealed type semiconductor device manufacturing method which can effect the resin sealing without any large deformation of the bonding wires.

The present invention is based upon a new knowledge that the above-mentioned defects of the prior art are caused because of unsufficient melting of the resin tablet before the injection. Since the injected resin is not sufficiently melted, it has a high molten viscosity and an incomplete progress of the hardening reaction. The present invention is characterized in that the viscosity of the sealing resin is dropped to improve the fluidity by heating the charged resin tablet for a predetermined time period before the injection.

According to the present invention, the resin tablet is applied to the cull portion and held in a slightly deformed state under a condition of stopping movement of the plunger for a predetermined time period so that the injection may be effected after the resin tablet is heated by the heats coming from the top and bottom forces. While the deformed state is held, the cylindrical side of the resin tablet and the inner wall of the pot portion are close contact with each other so that the contact area between the resin tablet and the mold surface is maximized to accomplish the heating efficiently. The viscosity of the injected resin is decreased by the sufficient heating so that the bonding wires are hardly deformed by the flow of the injected resin and the parting from the mold is facilitated.

The time period for the heating at the deformed state and at a condition of stopping vertical movement of the plunger depends upon the kind and amount of the sealing resin and is restricted by the time period required for the injection and the fluidity of the resin. Thus, the heating time period is preferably 5 sec or more and 20 sec or less when the thermoset resin to be molded at about 175° C. for the semiconductor device has a spiral flow value of 50 to 120 cm, the value indicating its fluidity, and a gelling time period of 10 to 50 sec. The especially suitable value for the heating is about 10 sec.

The process for manufacturing the resin-sealed type semiconductor device according to the present invention can be realized merely by changing the sequences for the injection while requiring neither any drastic change of the ordinary resin molding machine nor any design change and any addition of a preheater for the sealing resin.

BRIEF DESCRIPTION OF THE DRAWINGS

The above-mentioned and other objects, features and advantages of the present invention will become more apparent by reference to the following detailed description of the invention taken in conjunction with the accompanying drawings, wherein.

DETAILED DESCRIPTION OF THE PREFERRED EMBODIMENTS

A fabrication method of a first embodiment according to the present invention will be described in the following with reference to FIG. 1. In the present embodiment, a sealing resin to be used is an epoxy resin, and four resin tablets having a diameter of 13 mm and a height of 11 mm are used for one mold set. This mold has top and bottom forces which are heated in advance at 180° C. Each lead frame is mounted with eight semiconductor elements having a size of 4 mm×15 mm. Two lead frames are set in the cavity of the mold, and simultaneous injections from four cull portions are performed. One of these cull portions and its vicinity are shown in FIG. 1.

Figure 1A:
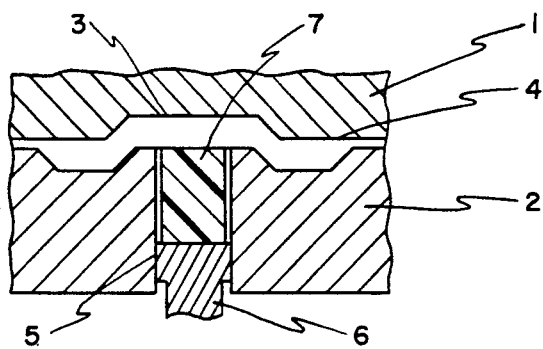
FIGS. 1A to 1D show a first embodiment of the present invention and are partially sectional views of a resin injecting portion, illustrating individual fabricating steps.

First of all, as shown in FIG. 1A, a pot portion 5, which is formed in a bottom force 2 and fitted with a plunger 6, is charged with a tablet-shaped sealing resin 7 on the plunger 6. Then, a top force 1 and the bottom force 2 are hydraulically clamped at their not-shown portions. When resin tablet 7 is charged, there is a clearance between the side face of the cylindrical contour of the tablet and the inner wall of the pot portion 5, and there is also a space above its top face because of the provision of the cull portion. Only its bottom face is in contact with the top face of the plunger 6. At this stage, therefore, the heat received from the bottom force 2 through the plunger 6 is remarkably restricted.

Figure 1B:
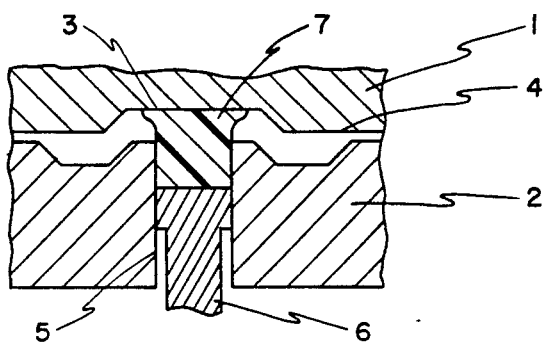

Next, as shown in FIG. 1B, the plunger 6 is raised to bring the sealing resin 7 into contact to the cull portion 3 of the top force 1 and to squash its upper part, and is then stopped and left as it is for a predetermined time period while mashing the sealing resin 7 slightly. As a result of this mashing step, the sealing resin has the side of the sealing resin is in close contact with the inner wall of the pot portion 5 and the top face is in close contact with the cull portion 3 over a rather extended area. Thus, the sealing resin 7 is sufficiently heated by the heat coming from the top and bottom forces.

Figure 1C:
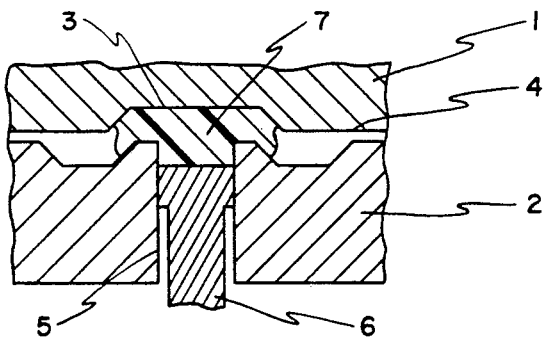

Next, as shown in FIG. 1C, the rise of the plunger 6 is restarted to compress the sealing resin 7 so that the resin 7 melts to flow into runner portions 4.

Figure 1D:
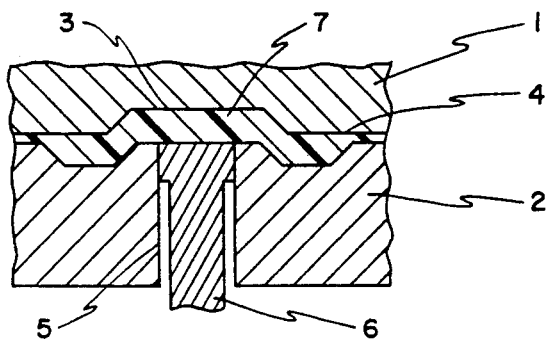

Next, as shown in FIG. 1D, the injection is completed by raising the plunger 6 further to feed the sealing resin 7 into the not-shown cavity portions. In this state, the sealing resin 7 stops flowing, and its hardening progresses.

Figure 4:
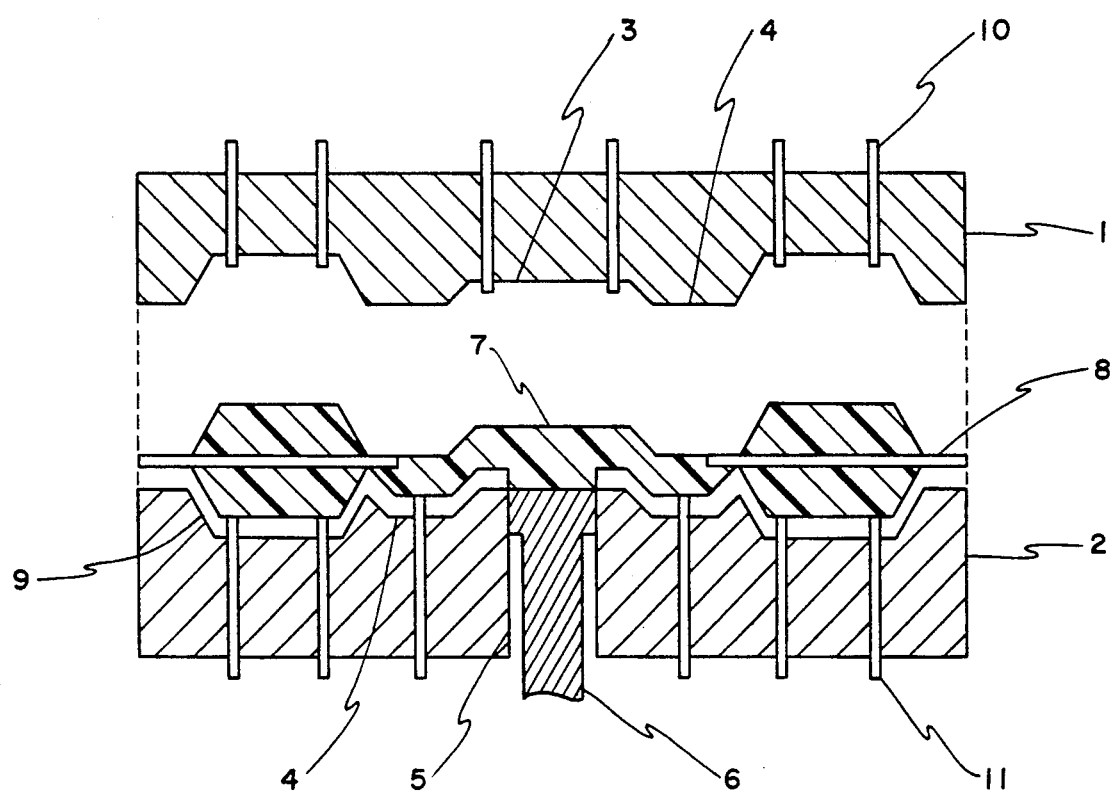
FIG. 4 is a section showing a mold for illustrating the parting of the sealing resin.

The parting and ejection of the hardened resin will be described with reference to FIG. 4. Cavity portions 9 on the both sides of the cull portion 3 are also shown in FIG. 4. First of all, the bottom force 2 is moved downward. Simultaneously with this, the ejector pins 10 of the top force 1 are pushed to part the hard sealing resin 7 from the top force 1. When the bottom force 2 drops to its bottom dead point, in which it is to be knocked out, the ejector pin 11 of the bottom force 2 are pushed to part the hard sealing resin 7 from the bottom force 2 altogether with its portions filling up the spaces of the cavity portions 9, the runner portions 4 and the cull portion 3. Thus, the sealing resin 7 is ejected from the mold together with the semiconductor elements (not-shown) which are resin-sealed on a lead frame 8.

Figure 3A:
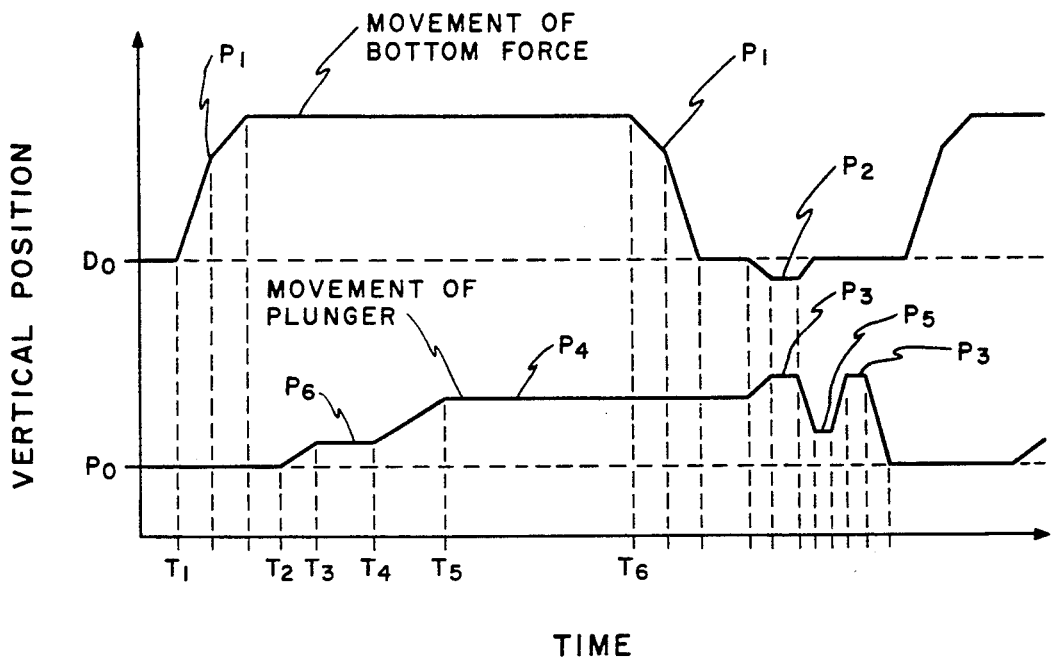
FIGS. 3A and 3B are timing charts showing the movement of the bottom force and the plunger of the first embodiment and the second embodiment according to the present invention, respectively.

Next, the timing operations of the manufacturing process of FIG. 1 will be described in detail with reference to FIG. 3A. In FIG. 3A, the ordinate plots the operation strokes of the bottom force and the plunger, and the abscissa plots the required time period. This time period indicates the lapse from a mold clamping start time $T_1$. After the charge of the resin tablet 7, the bottom force 2 starts rising simultaneously with the start of the mold clamping. After 5 sec, the bottom force 2 rises 40 mm from the original point $D_0$ to reach a speed changing point $P_1$. After 7 sec, the bottom force 2 rises 45 mm to complete the mold clamping. After 10 sec (at the injection start time $T_2$), the plunger 6 starts to rise. After 11 sec ($T_3$), the plunger 6 rises 2 mm from the origin $P_0$ to start the abutment of the sealing resin 7 against the cull portion 3, so that the plunger 6 reaches a tablet abutment position $P_6$ to stop during 5 sec. In other words, the heating is accomplished in 5 seconds. After 16 sec (11 sec + 5 sec), the injection is restarted at $T_4$, so that the plunger 6 rises 12 mm to reach an injection end point $P_4$. After 23 sec, the operation comes an injection end $T_5$. The sealing resin is hardened in that position. After 127 sec, the hardening ends to start the parting of the mold at $T_6$. Then, the bottom force 2 starts descending. After 129 sec, the bottom force 2 descends by 5 mm to pass the speed changing point $P_1$. After 134 sec, the bottom force 2 moves down by 40 mm from $P_1$ to return the original point $D_0$. After 140 sec, the rise of the plunger 6 and the fall of the bottom part 2 are simultaneously started. As a result, the plunger 6 rises 14 mm to reach the face position $P_3$ of the bottom force whereas the bottom force 2 reaches a knock-out position $P_2$. Then, these two members stop for 1 sec. so that the knock-out is accomplished by the ejector pins 11. After 142 sec, the bottom force 2 starts to rise to return to the original point $D_0$ at a time after 143 sec, whereas the plunger 6 drops from the original point $P_0$ to a head lowering position $P_5$ at a level of 2.5 mm from the original point $P_0$ to release the adhesion of the resin from the cull portion. After this, the plunger rises again to the face position $P_3$ of the bottom force until it returns to the original point $P_0$ at a time after 147 sec, thus ending one injection process.

Thus, the plunger stops for the heating for 5 sec. from the abutment start $T_3$ to the injection restart $T_4$ within the time period of 13 sec. from the injection start $T_2$ to the injection end $T_5$. Generally, the stopping period of the plunger (from $T_3$ to $T_4$) is 5 sec. or more and 20 sec. or less.

Figure 2A:
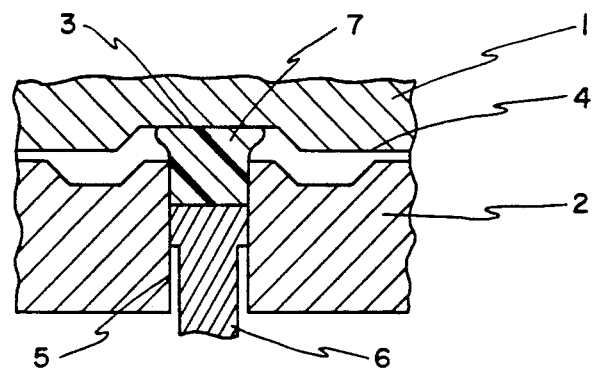
FIGS. 2A to 2C show a second embodiment of the present invention and are partially sectional views of a resin injecting portion, indicating individual fabricating steps.
Figure 2B:
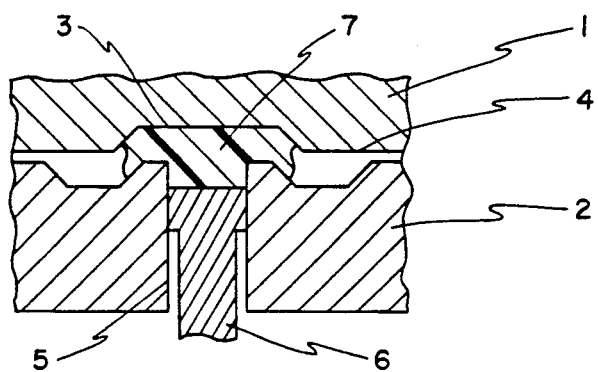
Figure 2C:
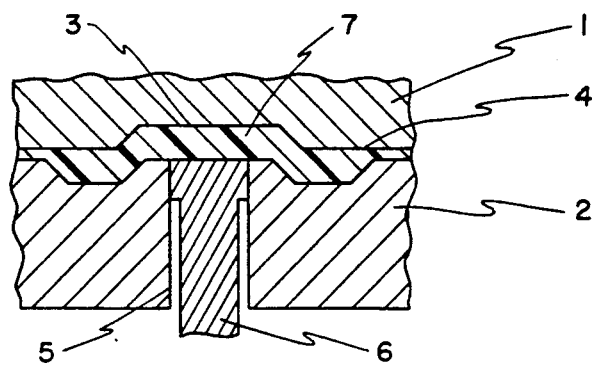

The fabrication process of a second embodiment according to the present invention will be described with reference to FIG. 2. The conditions in this description are identical to those of the first embodiment. As shown in FIG. 2A, the tablet-shaped sealing resin 7 put in the pot portion 5 is brought into abutment against the cull portion 3 of the top force 1 by the rise of the plunger 6. In this state, the top force 1 and the bottom force 2 are clamped. In other words, the plunger 6 starts to rise at the timing of the clamping start, and the sealing resin 7 has already been heated from both of the top and bottom forces at the end of the mold clamping. Next, as shown in FIG. 2B, the sealing resin 7 is melted by the rise of the plunger 6 and has the injection starts to flow into the runner portions 4. Next, as shown in FIG. 2C, the plunger 6 is further raised to feed the sealing resin 7 into the cavity portions (not shown) and harden it therein. The subsequent parting and draw of the sealing resin are similar to those described with reference to FIG. 4. In the present embodiment, the abutment against the cull portion 3 by the plunger 6 is carried out simultaneously with the molding clamping. Despite of this fact, the sealing resin 7 may have already been raised above the top face of the bottom force 2 before the mold clamping and adjustment may be made so that the upper face of the sealing resin abuts against the cull portion 3 after the mold clamping.

Figure 3B:
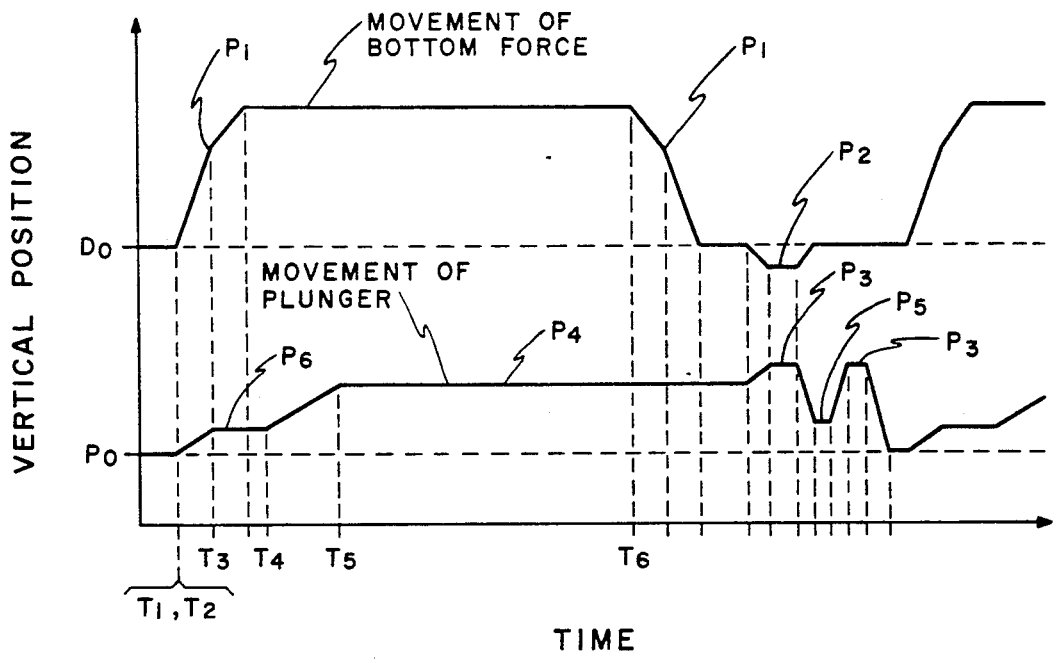

Next, the timing operations of the fabrication process of FIG. 2 will be described in the following with reference to FIG. 3B. The numerical values for this description are similar to those of FIG. 3A. In the present embodiment, the mold clamping start $T_1$ and the injection start $T_2$ occur simultaneously, and the rises of the plunger 6 and the bottom force 2 are started simultaneously with the start of the mold clamping. Accordingly, the timings of the abutment start $T_3$ and the injection restart $T_4$ becomes earlier to prolong the hardening time till the mold opening start $T_6$.

Table 1 shows, for the conventional method and the first and second embodiments of the present invention: the numbers of shots (i.e., injections) of defective parting per 100 shots (with additional notes of the time periods of interruption of operation due to the defective parting); the numbers of defectives due to curve of the bonding wires of the moldings per 100 shots for the lead frame having eight semiconductor elements mounted thereon; and the sealing yields (%) separately totaled. Moreover, in the righthand column, the number of shots in a cycle from a mold cleaning to the next cleaning are shown. It could be found that the numbers of defective parting and defectives are drastically reduced according to the present invention, that the filling yields are remarkably increased, and that the mold blotting is reduced to suppress the cleaning frequencies.

Although the present invention has been described with reference to the specific embodiments, it is not meant to be construed in a limiting sense. Various modifications of the disclosed embodiments, as well as other embodiments of the invention, will become apparent with reference to the description of the invention. It is therefore contemplated that the appended claims will cover any modifications as fall within the true scope of the invention.

What is claimed is:

1. A method of manufacturing a resin-sealed semiconductor device by a molding machine, said molding machine having a top force, a bottom force, a cull portion formed in said top force, a pot portion formed in said bottom force, a runner portion formed between said top and bottom forces and connected to said cull portion, a cavity portion formed between said top and bottom forces and connected to said runner portion, and a plunger fitted to said pot portion, said method comprising the steps of:

heating said top and bottom forces;

charging a cylindrical tablet of sealing resin on the upper face of said plunger within said pot portion such that a clearance is formed between the cylindrical side wall of said tablet and the inner wall of said pot portion;

clamping said top and bottom forces to each other;

raising said plunger until the upper part of said cylindrical tablet of sealing resin is squashed at said cull portion and said cylindrical side wall of said tablet is forced in close contact with said inner wall of said pot portion;

stopping said raising movement of said plunger during a predetermined period to heat said tablet as squashed from said cull portion of said top force, from said upper face of said plunger and from said inner wall of said pot portion of said bottom force, said tablet heated to decrease the viscosity of said resin sufficiently so that said resin can be injected without any large deformation of wires in said device;

thereafter, re-raising said plunger to inject said sealing resin into said cavity portion through said runner portion;

hardening said injected sealing resin; and parting said hardened sealing resin from said top and bottom forces.

2. A method according to claim 1 wherein said clamping step and said raising step to squash said upper part of said tablet at said cull portion are simultaneously performed.

3. A method according to claim 1, wherein said predetermined time period of said heating step is between 5 second and 20 seconds.

TABLE 1

|  | Number of Defective Parting (Interruption Time of Operation by the Defective Parting) | Number of Wire Defect by Shot | Sealing Yield % | Cleaning Frequency of Mold (Force) |
| --- | --- | --- | --- | --- |
| Prior Art | 23/100 (2.5) | 315/(8 × 100) | 55 | 1/590 Shots |
| First Embodiment | 1/100 (0.5) | 7/(8 × 100) | 95 | 1/1620 Shots |
| Second Embodiment | 0/100 (0) | 2/(8 × 100) | 98 | 1/2360 Shots |

* * * * *